United States Patent
Ueki

(10) Patent No.: US 8,989,456 B2
(45) Date of Patent: Mar. 24, 2015

(54) ATTRIBUTE DETERMINING METHOD, ATTRIBUTE DETERMINING APPARATUS, PROGRAM, RECORDING MEDIUM, AND ATTRIBUTE DETERMINING SYSTEM

(75) Inventor: Kazuya Ueki, Tokyo (JP)

(73) Assignee: NEC Solution Innovators, Ltd., Tokyo (JP)

( * ) Notice: Subject to any disclaimer, the term of this patent is extended or adjusted under 35 U.S.C. 154(b) by 153 days.

(21) Appl. No.: 13/807,674

(22) PCT Filed: May 12, 2011

(86) PCT No.: PCT/JP2011/060980
§ 371 (c)(1),
(2), (4) Date: Dec. 28, 2012

(87) PCT Pub. No.: WO2012/002047
PCT Pub. Date: Jan. 5, 2012

(65) Prior Publication Data
US 2013/0101224 A1 Apr. 25, 2013

(30) Foreign Application Priority Data
Jun. 30, 2010 (JP) ................................. 2010-149935

(51) Int. Cl.
*G06K 9/00* (2006.01)
*G06T 7/00* (2006.01)
*G06K 9/62* (2006.01)

(52) U.S. Cl.
CPC ........ *G06K 9/00362* (2013.01); *G06K 9/00268* (2013.01); *G06T 7/0042* (2013.01);

(Continued)

(58) Field of Classification Search
USPC ......................................................... 382/118
See application file for complete search history.

(56) References Cited

U.S. PATENT DOCUMENTS 6,801,641 B2 * 10/2004 Eraslan .......................... 382/118
7,430,314 B2 * 9/2008 Porter et al. ................... 382/159

(Continued)

FOREIGN PATENT DOCUMENTS

JP 10-307923 A 11/1998
JP 2008-90814 A 4/2008

(Continued)

OTHER PUBLICATIONS

Tsuiki et al., "Intelligent Handling of Relative Positions among Robot User", The Institute of Electronics, Information and Communication Engineers, Mar. 15, 2006, Technical Report vol. 105, No. 683, pp. 43 to 48.

(Continued)

*Primary Examiner* — Utpal Shah
(74) *Attorney, Agent, or Firm* — Sughrue Mion, PLLC

(57) ABSTRACT

The present invention is to provide an attribute determining method, an attribute determining apparatus, a program, a recording medium, and an attribute determining system of high detection accuracy with which an attribute of a person can be determined even in the case where a person is not facing nearly the front.

The attribute determining method of the present invention comprises: an image acquiring step (S11) of acquiring an image to be determined; a head region detecting step (S21) of detecting a head region from the image to be determined; and an attribute determining step (S22) of determining an attribute based on an image of the head.

18 Claims, 10 Drawing Sheets

(52) U.S. Cl.
CPC ...... *G06K 9/629* (2013.01); *G06T 2207/10004* (2013.01); *G06T 2207/30201* (2013.01); *G06T 2207/30232* (2013.01); *G06K 2009/00322* (2013.01)
USPC .......................................................... 382/118

(56) References Cited

U.S. PATENT DOCUMENTS

| | | | |
|---|---|---|---|
| 8,311,293 B2* | 11/2012 | Okada | 382/118 |
| 8,467,581 B2* | 6/2013 | Karimoto et al. | 382/118 |
| 8,594,390 B2* | 11/2013 | Yoshizumi | 382/118 |
| 2009/0087038 A1 | 4/2009 | Okada et al. | |
| 2010/0021066 A1 | 1/2010 | Sabe | |
| 2010/0111375 A1* | 5/2010 | Jones | 382/118 |

FOREIGN PATENT DOCUMENTS

| | | |
|---|---|---|
| JP | 2008-282089 A | 11/2008 |
| JP | 2009-87209 A | 4/2009 |
| JP | 2010-91299 A | 4/2010 |
| JP | 2010-92199 A | 4/2010 |

OTHER PUBLICATIONS

Ejima et al., "A Robust Human Motion Tracking System Using HeadFinder", The Institute of Electronics, Information and Communication Engineers, Nov. 9, 2000, Technical Report of IEICE, vol. 100, No. 442, pp. 15 to 22.

Mannami et al., "Gait-Based Categorization and Feature Analysis of Gender and Age" The Institute of Electronics, Information and Communication Engineers, Aug. 1, 2009, IEICE Transactions vol. J92-D, No. 8, pp. 1373-1382.

Communication dated Feb. 26, 2014 from the Japanese Patent Office in counterpart Japanese Application No. 2012-522505.

* cited by examiner

ATTRIBUTE DETERMINING METHOD, ATTRIBUTE DETERMINING APPARATUS, PROGRAM, RECORDING MEDIUM, AND ATTRIBUTE DETERMINING SYSTEM

CROSS REFERENCE TO RELATED APPLICATIONS

This application is a National Stage of International Application No. PCT/JP2011/060980 filed May 12, 2011, claiming priority based on Japanese Patent Application No. 2010-149935 filed Jun. 30, 2010, the contents of all of which are incorporated herein by reference in their entirety.

TECHNICAL FIELD

The present invention relates to an attribute determining method, an attribute determining apparatus, a program, a recording medium, and an attribute determining system.

BACKGROUND ART

A system for detecting a person from an image and determining attributes such as an age and a gender is utilized in various occasions such as various image communications such as a videoconference and a videophone; database searching; a security system such as a building security; and a facial recognition system. For example, there is a method of determining that the image shows the face of the person by performing pattern recognition with facial parts such as the eyes, the eyebrows, the nostril, and the mouth, which are characteristic parts of the face of a person, detecting the person in the image, and further determining an attribute (for example, see Patent Document 1). The method of detecting a part of the face is performed in the following order. First the head of the person is detected and then a facial part is extracted.

RELATED ART DOCUMENT

Patent Document

JP H10(1998)-307923 A

SUMMARY OF INVENTION

Problem to be Solved by the Invention

However, in the attribute determining method using the face, there are problems that the detection of a person and the determination of an attribute are difficult if a part of characteristic parts of the face is hidden and the detection and the determination can be performed only with a person facing nearly the front. Therefore, in the case of application of the method of this type, there is a need to provide a camera at a place suitable for photographing a person facing the front. However, in general, providing a camera at such a place is usually difficult.

Hence, the present invention is intended to provide an attribute determining method, an attribute determining apparatus, a program, a recording medium, and an attribute determining system of high detection accuracy with which an attribute of a person can be determined even in the case where a person is not facing nearly the front.

Means for Solving Problem

In order to achieve the aforementioned object, the attribute determining method of the present invention includes:

an image acquiring step of acquiring an image to be determined;
a head region detecting step of detecting a head region from the image to be determined; and
an attribute determining step of determining an attribute based on an image of the head.

The attribute determining apparatus of the present invention includes:

an image acquiring unit of acquiring an image to be determined;
a head region detecting unit of detecting a head region from the image to be determined; and
an attribute determining unit of determining an attribute based on an image of the head.

The program of the present invention causes a computer to execute the attribute determining method of the present invention.

The recording medium of the present invention is recorded with the program of the present invention.

The attribute determining system of the present invention includes:

an image acquiring unit of acquiring an image to be determined;
a head region detecting unit of detecting a head region from the image to be determined;
an attribute determining unit of determining an attribute based on an image of the head;
at least one of a head detection model acquired preliminarily and a head determination rule;
at least one of an attribute determination model and an attribute determination rule for determining an attribute based on the image of the head; and
an output unit of outputting a result of an attribute determination, wherein
the image acquiring unit and the output unit are connected to the head region detecting unit, the attribute determining unit, at least one of the head detection model and the head determination rule, and at least one of the attribute determination model and the attribute determination rule via a communication network provided outside of the system.

Effects of the Invention

According to the present invention, an attribute determining method, an attribute determining apparatus, a program, a recording medium, and an attribute determining system of high detection accuracy with which an attribute of a person can be determined even in the case where a person is not facing nearly the front can be provided.

DESCRIPTION OF EMBODIMENTS

Next, Embodiments of the present invention will be described. Note here that the present invention is not limited or restricted by the Embodiments described below. In the following FIGS. 1 to 7, identical parts are indicated with identical numerals and symbols.

Embodiment 1

Figure 1A:
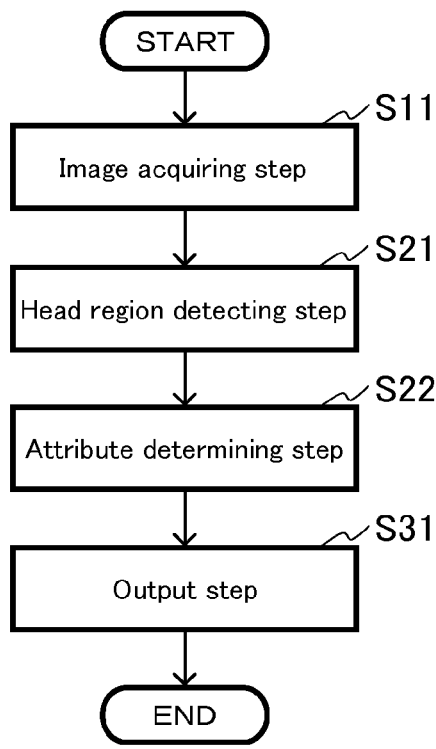
FIG. 1A is a flowchart showing an example (Embodiment 1) of the attribute determining method of the present invention.
Figure 1B:
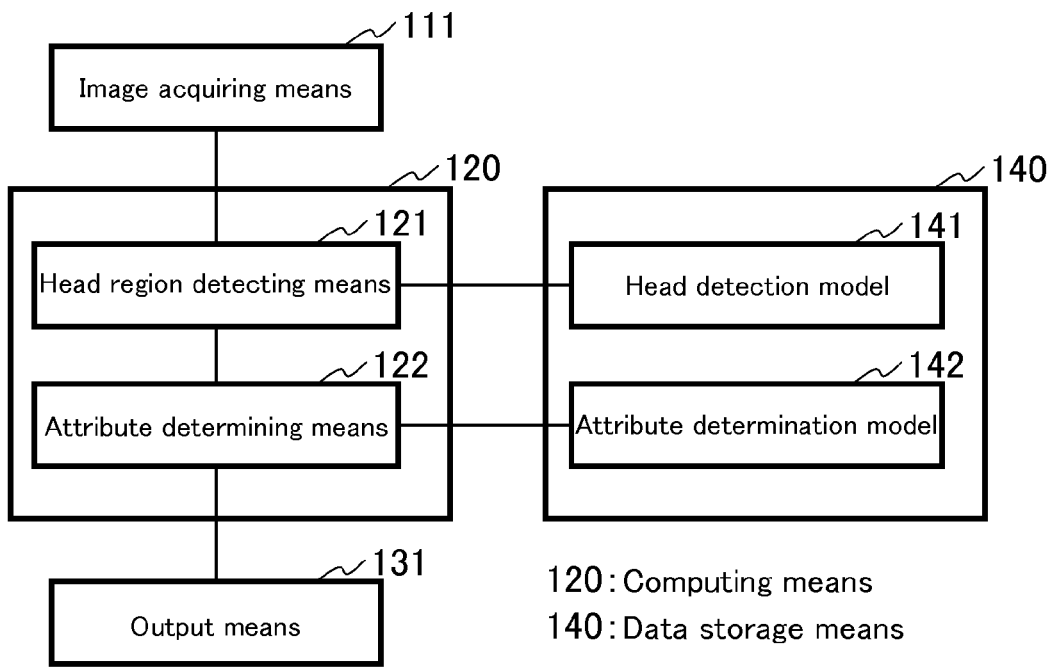
FIG. 1B is a block diagram showing the configuration of an example (Embodiment 1) of the attribute determining apparatus of the present invention.

FIG. 1A shows a flowchart of the attribute determining method of Embodiment 1. FIG. 1B shows a block diagram of the attribute determining apparatus of Embodiment 1. As shown in FIG. 1B, the attribute determining apparatus of Embodiment 1 includes image acquiring means (unit) 111, computing means (unit) 120, output means (unit) 131, and data storage means (unit) 140 as main components. The image acquiring means 111 is electrically connected to the computing means 120. The computing means 120 is electrically connected to the output means 131 and the data storage means 140. The computing means 120 includes head region detecting means (unit) 121 and attribute determining means (unit) 122. Preliminarily acquired head detection model 141 and attribute determination model 142 are stored in the data storage means 140. The head region detecting means 121 is connected to the head detection model 141. The attribute determining means 122 is connected to the attribute determination model 142.

Examples of the image acquiring means 111 include a charge coupled device (CCD) camera, a complementary metal oxide semiconductor (CMOS) camera, and an image scanner. An example of the computing means 120 includes a central processing unit (CPU). Examples of the output means 131 include a monitor outputting data by an image (for example, image displays such as a liquid crystal display (LCD) and a cathode-ray tube (CRT) display), a printer outputting data by printing, and a speaker outputting data by a sound. The output means 131 is an optional component. The attribute determining apparatus of the present invention preferably includes the output means 131 although it is not always necessary. Examples of the data storage means 140 include a random access memory (RAM), a read-only memory (ROM), a hard disk (HD), an optical disk, and a floppy (registered trade name) disk (FD). The data storage means 140 may be, for example, a built-in type or an external type such as an external storage device. With respect to the image acquiring means, the computing means, the output means, and the data storage means, the same applies to the Embodiments described below.

In the present invention, there is no particular limitation on an attribute, and examples of the attribute include a gender, an age, a race, the angle of the head, the length of the hair, with or without a hat, the color of the hair, a hairstyle, the direction of the face, facial expressions, with or without glasses or sunglasses, with or without a mask, and with or without mustache or beard.

The attribute determining method of Embodiment 1 is performed, for example, using the attribute determining apparatus of FIG. 1B as follows.

First, before performing the attribute determining method, learning is performed using a machine learning (pattern recognition) technique. Specifically, first, a head detection model 141 is formed by performing learning by machine learning (pattern recognition) with head regions of images for learning as positive examples and with non-head regions of images for learning as negative examples. Specifically, for example, as shown in FIGS. 2A to 2D, first, the head regions are applied by respectively applying labels 11a, 11b, 11c, and 11d to images for learning 10a (front-facing male), 10b (front-facing female), 10c (side-facing male), and 10d (rear-facing female). Application of the training data of the head region is made by a person by inputting using conventionally known input means such as a keyboard, a mouse, or the like, for example. In consideration of detection accuracy, the more the number of the images for learning, the better. In addition, it is preferable to prepare a lot of images for learning for forming the head detection model.

Next, by applying training data for determining attribute to the head regions and using many head regions to each of which the training data for determining attribute is applied, the attribute determination model 142 is formed by machine learning (pattern recognition). In the attribute determining method of Embodiment 1, examples of the training data for determining attribute include training data such as a gender and an age. Specifically, for example, the training data for determining attribute, "gender: male", is applied to the head region of the image for learning shown in FIG. 2A. For example, the training data for determining attribute, "gender: female", is applied to the head region of the image for learning shown in FIG. 2B. Further, for example, the training data for determining attribute such as an age such as "age: 30" is applied to the image for learning shown in FIG. 2A and "age: 20" is applied to the image for learning shown in FIG. 2B. Furthermore, in the case of using the item of "direction" for attribute determination, for example, the training data for determining attribute of the direction of the head such as the direction data indicated on one degree basis (for example, leftward) 60° and the direction data according to the 8 directions (for example, 0°, 45°, 90°, and etc.) can also be applied. In the case of performing the attribute determination by performing learning by machine learning, both the method (regression) of estimating continuous values such as an age and the method (classification) of estimating categories such as male/female can be used. Application of the training data for determining attribute such as the gender and the age is made by a person by inputting using conventionally known input means such as a keyboard, a mouse, or the like, for example. Also, the attribute determination can be performed not by employing learning but by employing the method (attribute determination rule) in which a human makes a rule and determines an attribute.

Next, as shown in the flowchart of FIG. 1A, the following steps are performed. First, an image to be determined is acquired by the image acquiring means 111 (step S11).

Figure 3A:
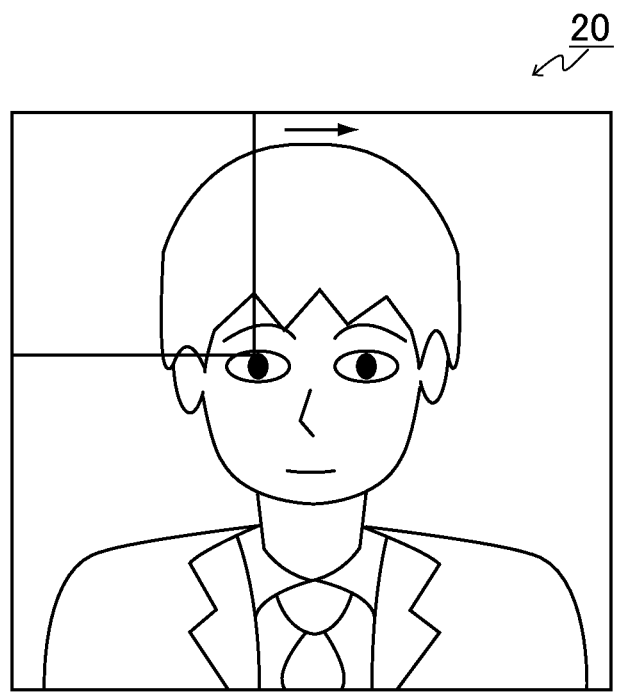
FIGS. 3A and 3B are views for explaining an example of the head region detecting step in the present invention.
Figure 3B:
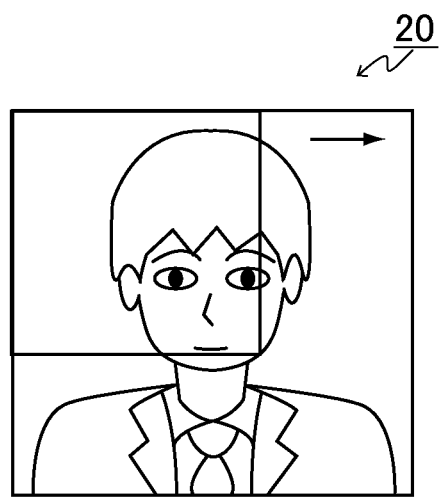

Next, by the head region detecting means 121, by referring to the head detection model 141 formed preliminarily by performing learning using many images for learning to each of which the training data of the head region is applied, the head region data is detected from the image to be determined (step S21). Specifically, for example, as shown in FIG. 3A, by specifying the size of a desired head region to be detected and by referring to the head detection model 141 preliminarily formed, the head region is searched by a so-called raster scanning by moving the image patch in the horizontal direction from the upper left end of the image to be detected 20 and continuously moving downward in order. In addition, for example, as shown in FIG. 3B, by changing the acquiring size of the image to be determined 20 and searching the head region, the data of the head region is detected. It is preferable to detect the data of the head region in this manner because the alignment of the head region can be performed at the same time. Note here that the detection of the head is not limited to this example. For example, the detection can be performed by detecting a circular object in the image to be determined as the head region and performing the alignment of the detected head region. The alignment may be performed, for example, by alignment means (unit) (not shown) contained in the computing means.

Next, an attribute is determined based on the image of the head by the attribute determining means 122 by referring to the attribute determination model 142 acquired preliminarily by performing learning using many head regions to each of which the training data for determining attribute is applied (step S22). Examples of the determination item include a gender, an age, a race, the angle of the head, the length of the hair, with or without a hat, the color of the hair, a hairstyle, the direction of the face, facial expressions, with or without glasses or sunglasses, with or without a mask, and with or without mustache or beard. In the case where the determination item is a gender, for example, the determination can be made based on a gender degree (for example, 0 to 1). The gender degree can be calculated based on the head region data. Specifically, for example, a criterion is set as follows. That is, it is determined as "female" if the gender degree is "0 to less than 0.5" and it is determined as "male" if the gender degree is "0.5 to 1". Determination of the gender is performed from the value of the calculated gender degree. The criterion for determining gender from the gender degree is not limited to this example. For example, the criterion can be as follows. That is, it is determined as "female" if the gender degree is "0 to 0.3", it is determined as "male" if the gender degree is "0.7 to 1", and it is determined as "undeterminable" if the gender degree is "more than 0.3 and less than 0.7". Also with respect to the age and the like, for example, by setting predetermined criteria, determination of the age and the like are performed from the values calculated based on the head region data.

Next, the determination result of the attribute is outputted by the output means 131 (step S31). Examples of the determination item are the same as those described above. The output step S31 is an optional step. The attribute determining method of the present invention preferably includes the output step S31 although it is not always necessary.

As described above, according to the attribute determining method of Embodiment 1, since an attribute is determined based on the head itself, the detection of a person and the determination of an attribute can be performed even in the case where a person is not facing nearly the front. Further, according to the attribute determining method of Embodiment 1, as described above, since an attribute is determined based on the head itself, for example, the attribute can be determined even in the case where the face is not visible. This makes it possible to expand the range of choices for a site where image acquiring means (for example, surveillance camera, and the like) is placed, for example. For example, it is possible to use existing surveillance cameras and the like. Further, since not the face but the head itself is used for determining an attribute, unlike the case of using the face in which the attribute determination is difficult unless an image showing a person facing nearly the front is used, for example, the attribute determination can be made with images (frames) showing persons photographed from any directions such as an image showing a person photographed from the rear side. Therefore, for example, there is no need to photograph many frames. Further, since images showing persons photographed from any directions can be used for determining an attribute, for example, variety of information can be acquired. Comprehensively, the attribute can be determined with higher accuracy. With respect to these effects, the same applies to the Embodiments described below.

Figure 1C:
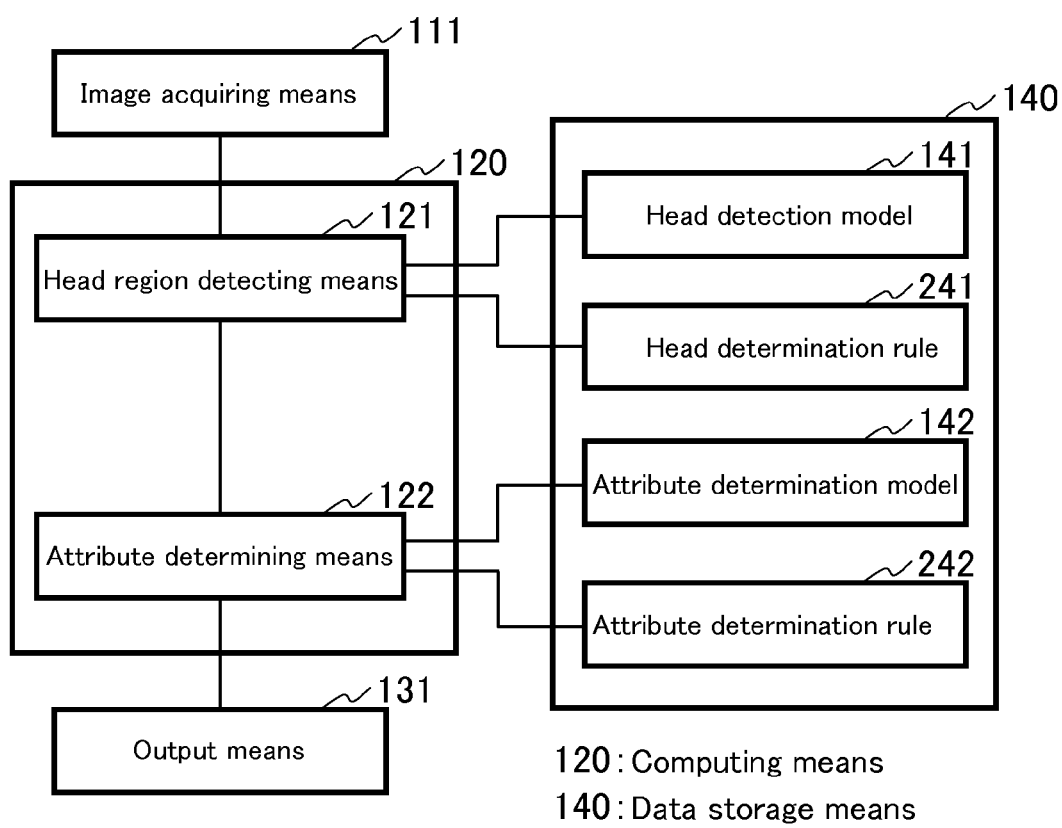
FIG. 1C is a block diagram showing another example of the attribute determining apparatus of Embodiment 1.
Figure 2A:
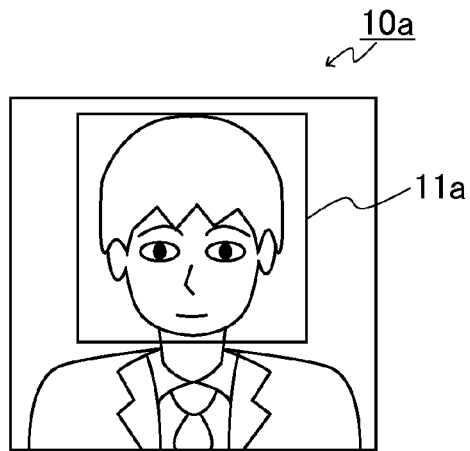
FIGS. 2A to 2D are views for explaining examples of applications of head regions (positive examples) to images for learning in the present invention.
Figure 2B:
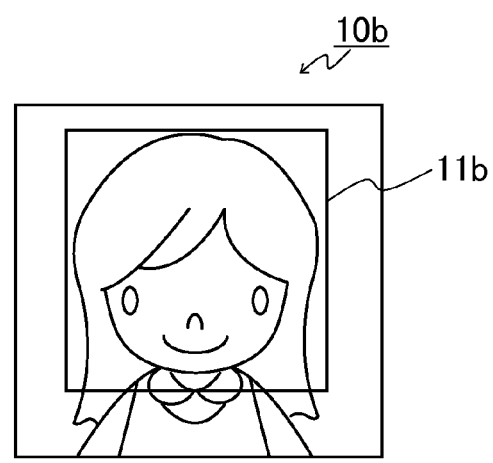
Figure 2C:
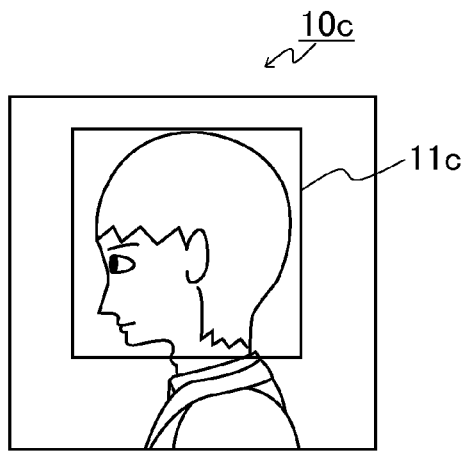
Figure 2D:
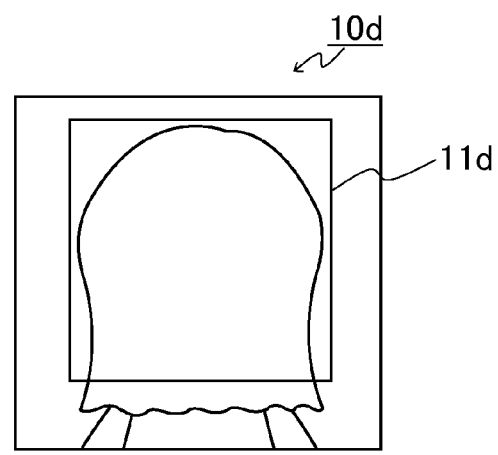

In the head region detecting step (S21 in FIG. 1A) in the attribute determining method of Embodiment 1, the head region is detected from the image to be determined by referring to the head detection model. However, the present invention is not limited thereto. The head region may be detected by referring to a head determination rule, for example. An example of the head determination rule includes the rule such as "a circular object in the image to be determined is a head region". Furthermore, for example, the head region may be detected by referring to both the head detection model and the head determination rule. In this case, for example, as shown in FIG. 1C, a head determination rule 241 may be stored in the data storage means 140 and the head region detecting means 121 may be connected to the head determination rule 241.

In the attribute determining step (S22 in FIG. 1A) in the attribute determining method of Embodiment 1, the determination of the attribute is performed based on the image of the head by referring to the attribute determination model. However, the present invention is not limited thereto. The attribute may be determined by referring to an attribute determination rule, for example. An example of the attribute determination rule includes the rule such as "it is determined as a female if the hair is long and it is determined as a male if the hair is short". Furthermore, for example, the attribute may be determined by referring to both the attribute determination model and the attribute determination rule. In this case, for example, as shown in FIG. 1C, an attribute determination rule 242 may be stored in the data storage means 140 and the attribute determining means 122 may be connected to the attribute determination rule 242.

Embodiment 2

Figure 4A:
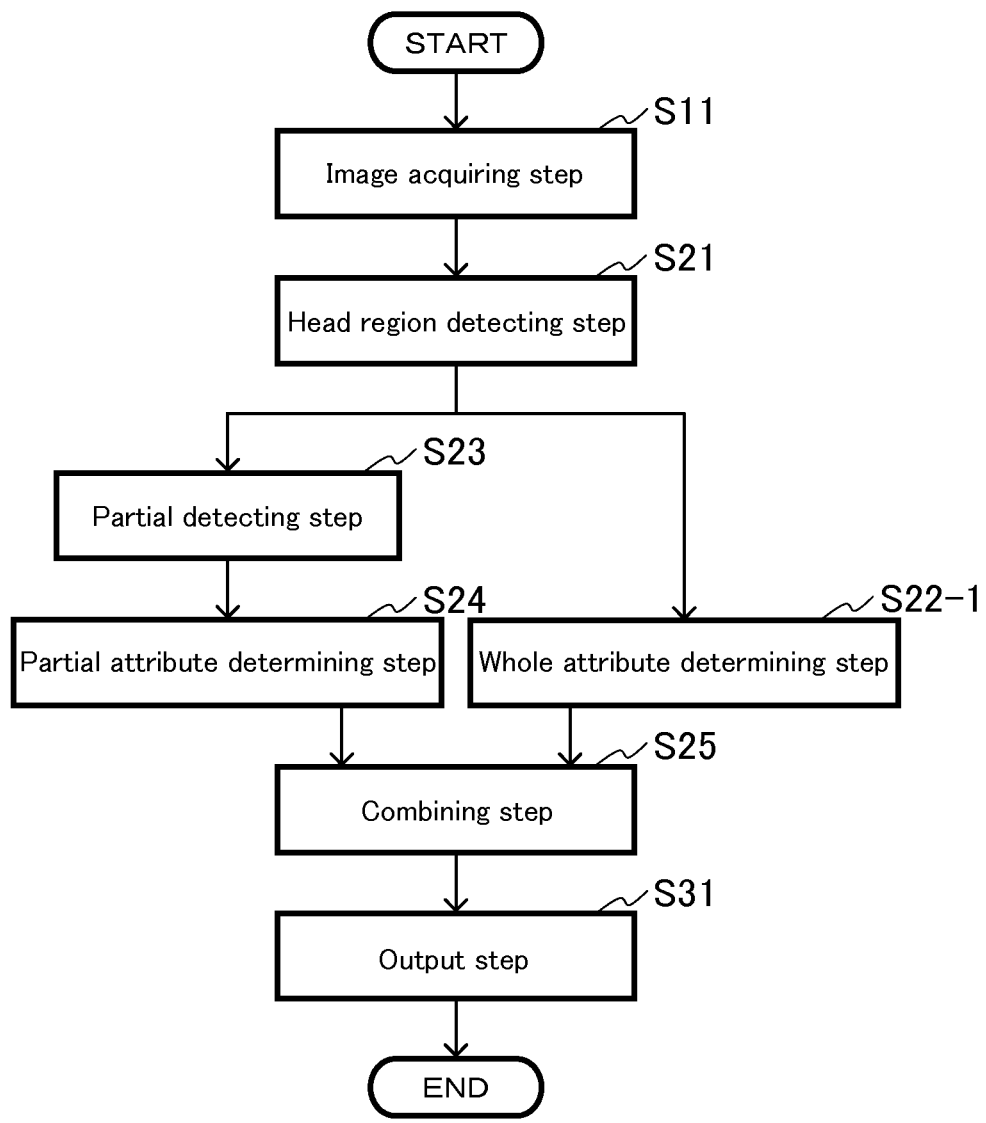
FIG. 4A is a flowchart showing another example (Embodiment 2) of the attribute determining method of the present invention.
Figure 4B:
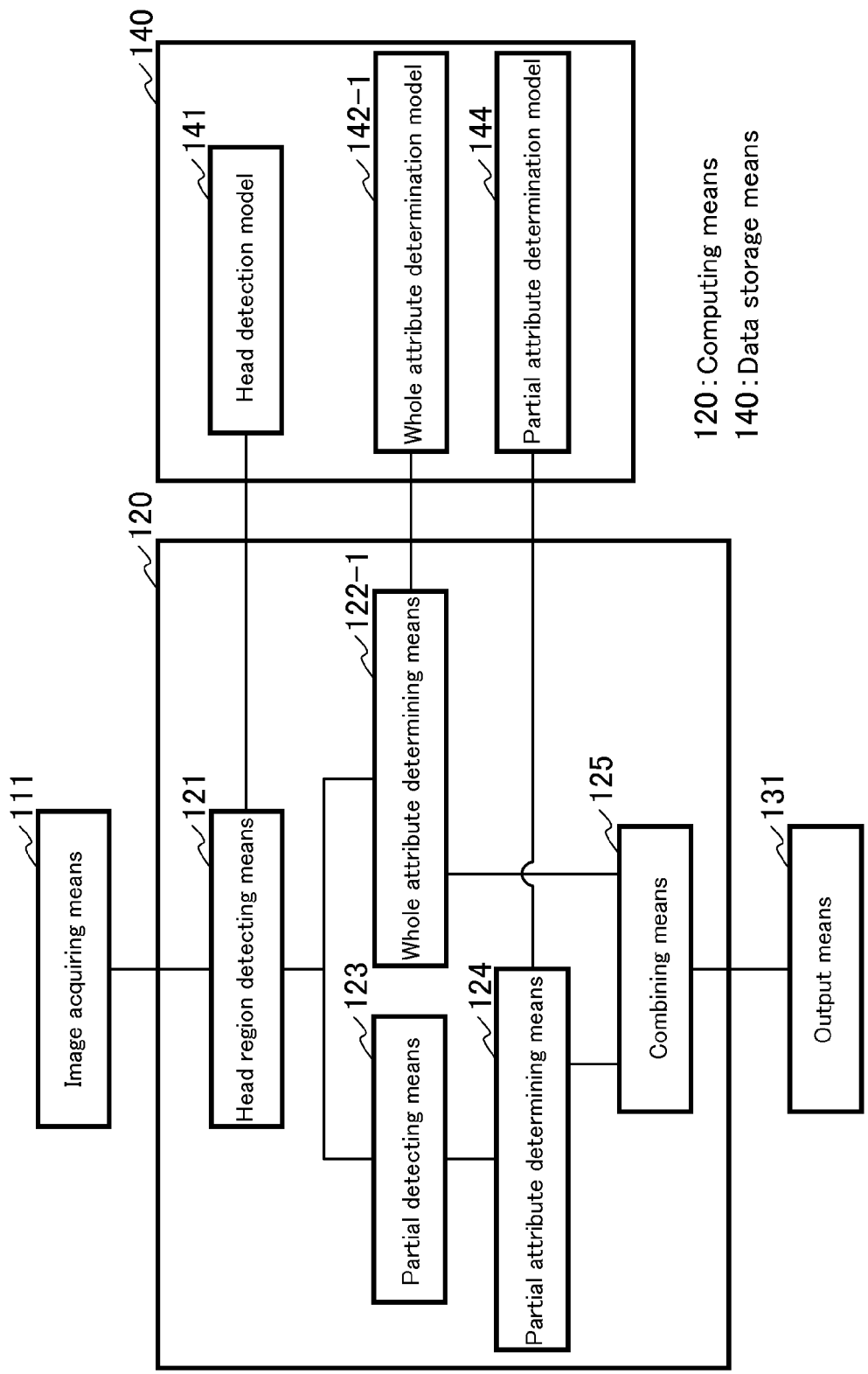
FIG. 4B is a block diagram showing the configuration of another example (Embodiment 2) of the attribute determining apparatus of the present invention.

FIG. 4A shows a flowchart of the attribute determining method of Embodiment 2. FIG. 4B shows a block diagram of the attribute determining apparatus of Embodiment 2. As shown in FIG. 4B, in the attribute determining apparatus of Embodiment 2, computing means (unit) 120 includes whole attribute determining means (unit) 122-1, partial detecting means (unit) 123, partial attribute determining means (unit) 124, and combining means (unit) 125, and a whole attribute determination model 142-1 and a partial attribute determination model 144 are stored in data storage means 140. The whole attribute determining means 122-1 is connected to the whole attribute determination model 142-1. The partial attribute determining means 124 is connected to the partial attribute determination model 144. The configuration of Embodiment 2 other than these is the same as that of the attribute determining apparatus of Embodiment 1 shown in FIG. 1B.

In the present invention, a part is a part of the head region, and examples thereof include hair (region, length, and the like of hair), the eyes, the nose, the mouth, the eyebrows, the ears, something put on the head (hat, hood, and the like), glasses, sunglasses, masks, and the like. With respect to the eyes, the eyebrows, and the ears, for example, one of each of the eyes, the eyebrows, and the ears may be regarded as a separated part or both of each of the eyes, the eyebrows, and the ears may be regarded as one part.

The attribute determining method of Embodiment 2 is performed, for example, using the attribute determining apparatus of FIG. 4B as follows. The attribute determining method of Embodiment 2 will be described with the case where the part is hair as an example. However, the attribute determining method of the present invention is not limited to this example.

First, before performing the attribute determining method, learning is performed using a machine learning (pattern recognition) technique. Specifically, first, in the same manner as in Embodiment 1, a head detection model 141 is formed by learning an image for learning by machine learning (pattern recognition). Next, in the same manner as the formation of the attribute determination model 142 in Embodiment 1, the whole attribute determination model 142-1 is formed.

On the other hand, from the head region of the image for learning, the partial attribute determination model 144 with respect to hair is formed. Specifically, for example, first, the training data, "gender: male", is applied to the image obtained by cutting out the region of the hair of the image for learning shown in FIG. 2A; and the training data, "gender: female", is applied to the image obtained by cutting out the region of the hair of the image for learning shown in FIG. 2B. The training data is formed by a person by inputting using conventionally known input means such as a keyboard, a mouse, or the like, for example. Next, using many images each obtained by cutting out the region of the hair to each of which the training data is applied, the partial attribute determination model 144 with respect to the hair is formed.

Next, as shown in the flowchart of FIG. 4A, the following steps are performed. First, an image to be determined is acquired by the image acquiring means 111 (step S11).

Next, in the same manner as in Embodiment 1, by the head region detecting means 121, the head region data is detected from the image to be determined by referring to the head detection model 141 formed preliminarily (step S21). After detecting the head region data, the region of the hair contained in the detected head region data is detected by the partial detecting means 123 (step S23).

Next, in the same manner as in the attribute determining step S22 in Embodiment 1, an attribute is determined based on the image of the head by the whole attribute determining means 122-1 by referring to the whole attribute determination model 142-1 acquired preliminarily (step S22-1). In the case where the determination item is a gender, for example, in the same manner as in Embodiment 1, the determination can be made based on a gender degree (for example, 0 to 1).

An attribute in the region of the hair is determined by the partial attribute determining means 124 by referring to the partial attribute determination model 144 acquired preliminarily in parallel with or one after another with the attribute determination based on the image of the head (step S24). In the case where the determination item is a gender, for example, the determination can be made based on a gender degree (for example, 0 to 1) at the pertinent part (region of hair).

Next, by the combining means 125, the determination result obtained in the whole attribute determining step S22-1 and the determination result obtained in the partial attribute determining step S24 are combined (step S25). In the combining step S25, the combination of the determination items (determination results) can be performed by the following formula (1). In the following formula (1), "n" represents the number of the images to be determined (frames).

$$\text{Attribute degree of object to be determined} = \frac{\sum_{i=1}^{n}\left\{\binom{\text{Confidence level in}}{\text{determination item}} \times \binom{\text{Attribute}}{\text{degree}}\right\}}{\sum_{i=1}^{n}\binom{\text{Confidence level in}}{\text{determination item}}} \quad (1)$$

In the case where the determination item is a gender, the combination of the determination results can be performed by the following formula (2), for example.

$$\text{Gender degree of object to be determined} = \frac{\begin{pmatrix}\text{Confidence}\\\text{level in gender}\\\text{in whole}\end{pmatrix} \times \begin{pmatrix}\text{Gender}\\\text{degree}\\\text{in whole}\end{pmatrix} + \begin{pmatrix}\text{Confidence}\\\text{level in gender}\\\text{in part}\end{pmatrix} \times \begin{pmatrix}\text{Gender}\\\text{degree}\\\text{in part}\end{pmatrix}}{\begin{pmatrix}\text{Confidence}\\\text{level in gender}\\\text{in whole}\end{pmatrix} + \begin{pmatrix}\text{Confidence}\\\text{level in gender}\\\text{in part}\end{pmatrix}} \quad (2)$$

In the formula (2), the "gender degree in whole" refers to the gender degree calculated in the whole attribute determining step S22-1. The "gender degree in part" refers to the gender degree calculated in the partial attribute determining step S24. The "confidence level in gender in whole" can be expressed, for example, by a value greater than 0 and not more than 1 and indicates the level of the reliability of the gender degree calculated in the whole attribute determining step S22-1. Further, the "confidence level in gender in part" can be expressed, for example, by a value greater than 0 and not more than 1 and indicates the level of the reliability of the gender degree calculated in the partial attribute determining step S24. The confidence level in gender in whole and the confidence level in gender in part can be determined according to the performance of the model to be used. For example, in the case where the reliability is 70% accuracy when the gender is determined based on the whole image and the reliability is 80% accuracy when the gender is determined based on the image extracting the hair, by increasing the confidence level of the latter, the determination at high detection accuracy can be made.

Further, for example, under the condition where the whole image to be determined is dark, since the color of the whole head region becomes dark, there is a case where the gender degree is biased toward a male despite the fact that the person in the image is a female. In this manner, in the case of the condition where the whole image to be determined is dark, since the reliability of the determination of the gender at the whole head region is low, the confidence level in gender in whole is set low (numerical value of nearly 0). On the other hand, for example, in an area where the Mongoloid (race with black hair) or the like is in common as a person to be determined, since a person is seen as if having long hair despite the fact that a person has short hair under the condition where the background in the vicinity of the head region is black, there is a case where the gender degree is biased toward a female. In this manner, in the case of the condition where the background in the vicinity of the head region is black, since the reliability of the determination of the gender with the length (part) of the hair is low, the confidence level is set low (numerical value of nearly 0).

Next, the combined determination result of the attribute is outputted by the output means 131 (step S31). The gender is determined from the value of the gender degree calculated by the combination, based on the criteria described in Embodiment 1, for example.

In the attribute determining method of Embodiment 2, the attribute is determined based on the whole head region, the attribute is determined based on a part of the head region, and then the attribute is determined by combining these determination results. Therefore, for example, the attribute can be determined with higher accuracy.

The formula (2) is a formula for the case where one frame is used. The combination of the determination results can be performed by the formula (3) in the case where more than one frame is used. By increasing the number of frames, for example, the attribute can be determined based on the image with higher accuracy. In the formula (3), "n" represents the number of frames.

$$\text{Gender degree of object to be determined} = \frac{\sum_{i=1}^{n}\left\{\begin{pmatrix}\text{Confidence}\\\text{level in gender}\\\text{in whole}\end{pmatrix}\times\begin{pmatrix}\text{Gender}\\\text{degree}\\\text{in whole}\end{pmatrix}\right\} + \sum_{i=1}^{n}\left\{\begin{pmatrix}\text{Confidence}\\\text{level in gender}\\\text{in part}\end{pmatrix}\times\begin{pmatrix}\text{Gender}\\\text{degree}\\\text{in part}\end{pmatrix}\right\}}{\sum_{i=1}^{n}\begin{pmatrix}\text{Confidence}\\\text{level in gender}\\\text{in whole}\end{pmatrix} + \sum_{i=1}^{n}\begin{pmatrix}\text{Confidence}\\\text{level in gender}\\\text{in part}\end{pmatrix}} \quad (3)$$

Further, in the partial attribute determining step (S24 in FIG. 4A) in the attribute determining method of Embodiment 2, the attribute is determined based on the image of a part of the head region by referring to the partial attribute determination model. However, the present invention is not limited thereto. The attribute of the part of the head region may be determined by referring to a partial attribute determination rule, for example. An example of the partial attribute determination rule includes the rule such as "it is determined as a female if the hair is long and it is determined as a male if the hair is short". The partial attribute determination rule can be prepared as follows. For example, the rule can be made by applying the training data, "hair length: short", to the head region of the image for learning shown in FIG. 2A and the training data, "hair length: long", to the head region of the image for learning shown in FIG. 2B, forming a hair length estimation model, estimating the length of the hair based on the hair length estimation model, and determining the gender based on the length of the hair such as "short: male" and "long: female". Further, for example, the attribute of the part of the head region may be determined by referring to both the partial attribute determination model and the partial attribute determination rule. In this case, for example, the partial attribute determination rule may be stored in the data storage means and the partial attribute determining means may be connected to the partial attribute determination rule.

Embodiment 3

Figure 5A:
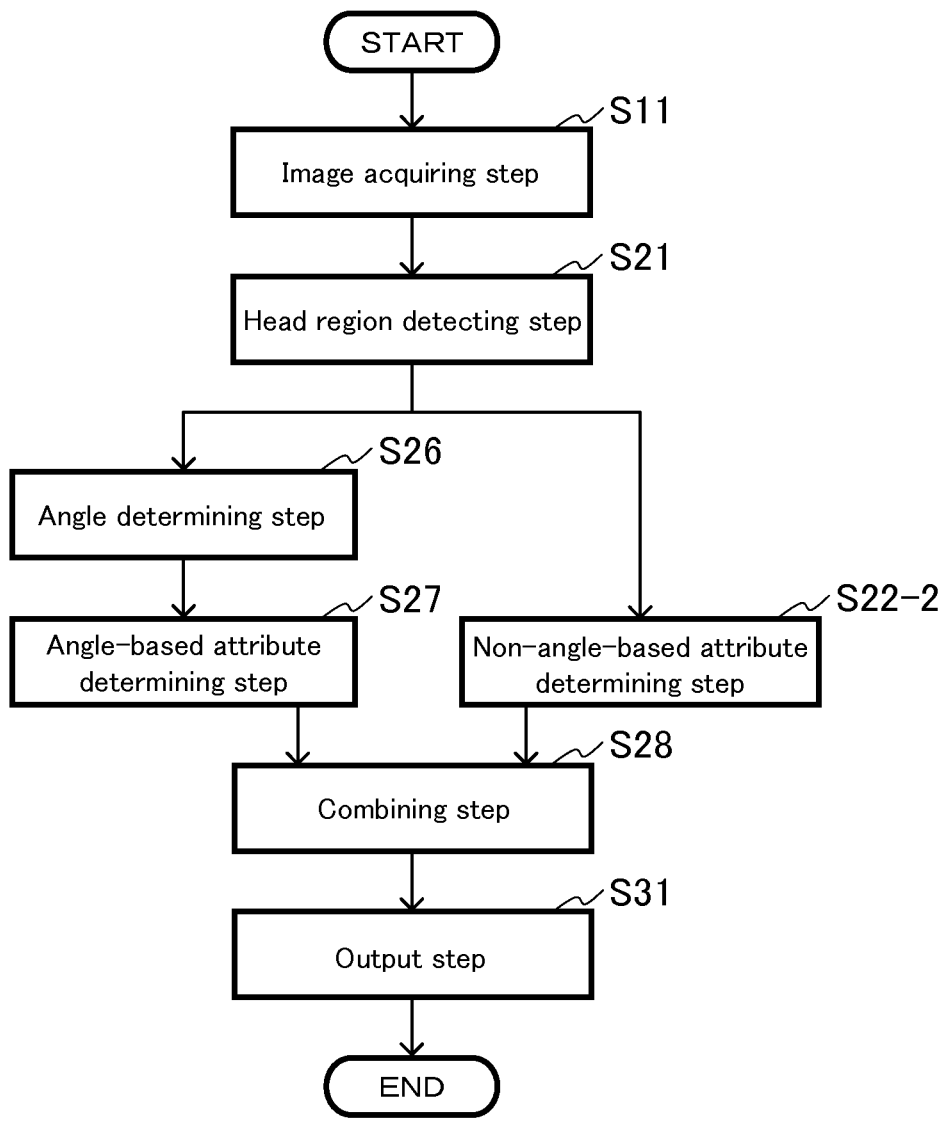
FIG. 5A is a flowchart showing yet another example (Embodiment 3) of the attribute determining method of the present invention.
Figure 5B:
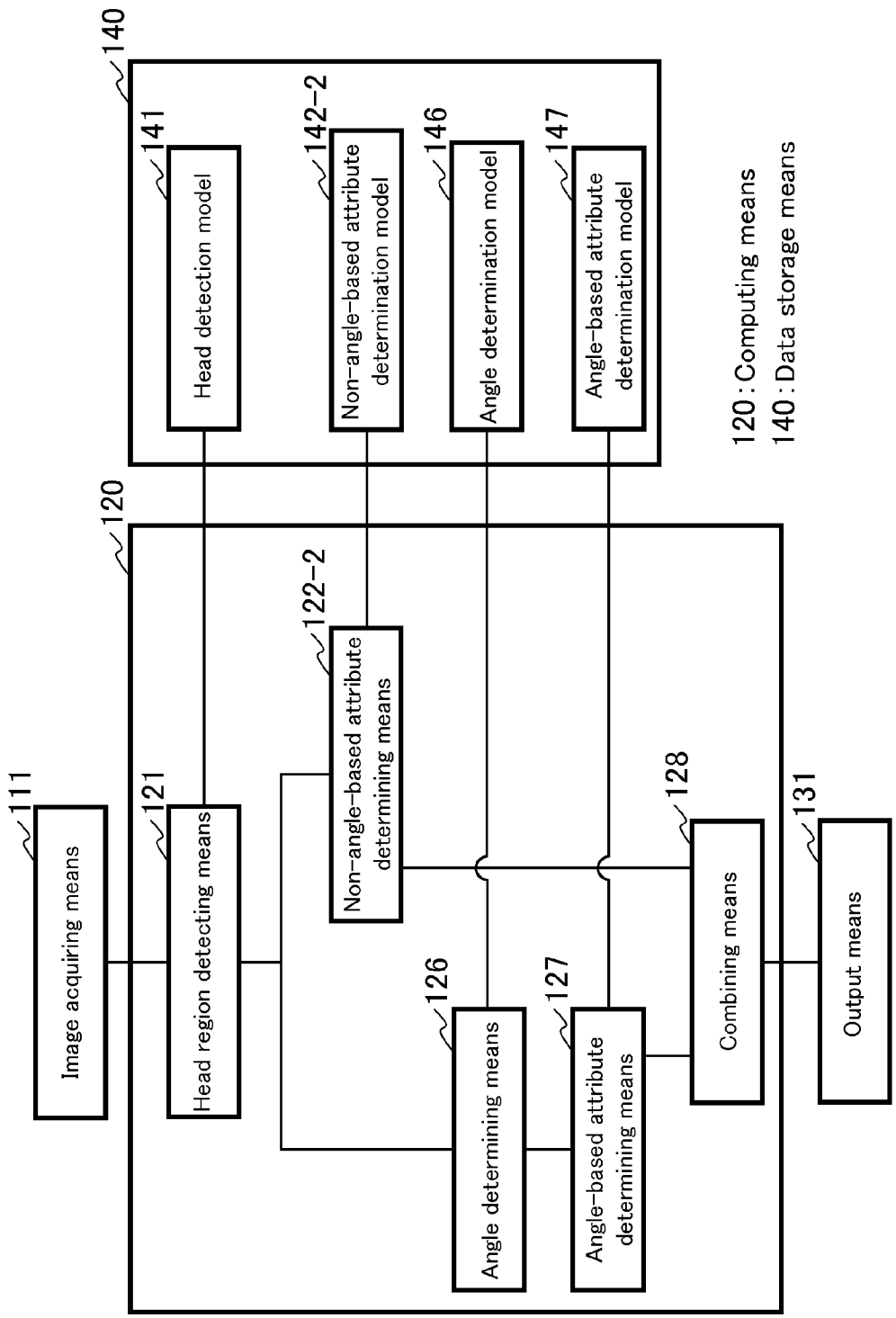
FIG. 5B is a block diagram showing the configuration of yet another example (Embodiment 3) of the attribute determining apparatus of the present invention.

FIG. 5A shows a flowchart of the attribute determining method of Embodiment 3. FIG. 5B shows a block diagram of the attribute determining apparatus of Embodiment 3. As shown in FIG. 5B, in the attribute determining apparatus of Embodiment 3, computing means (unit) 120 includes non-angle-based attribute determining means (unit) 122-2, angle determining means (unit) 126, angle-based attribute determining means (unit) 127, and combining means (unit) 128, and a non-angle-based attribute determination model 142-2, an angle determination model 146, and an angle-based attribute determination model 147 are stored in data storage means 140. The non-angle-based attribute determining means 122-2 is connected to the non-angle-based attribute determination model 142-2. The angle determining means 126 is connected to the angle determination model 146. The angle-based attribute determining means 127 is connected to the angle-based attribute determination model 147. The configuration of Embodiment 3 other than these is the same as that of the attribute determining apparatus of Embodiment 1 shown in FIG. 1B.

The attribute determining method of Embodiment 1 is performed, for example, using the attribute determining apparatus of FIG. 5B as follows.

First, before performing the attribute determining method, learning is performed using a machine learning (pattern recognition) technique. Specifically, first, in the same manner as in Embodiment 1, a head detection model 141 is formed by learning an image for learning by machine learning (pattern recognition). Next, in the same manner as the formation of the attribute determination model 142 in Embodiment 1, the non-angle-based attribute determination model 142-2 for determining the attribute based on the head image without reference to the angle of the head is formed.

Figure 6A:
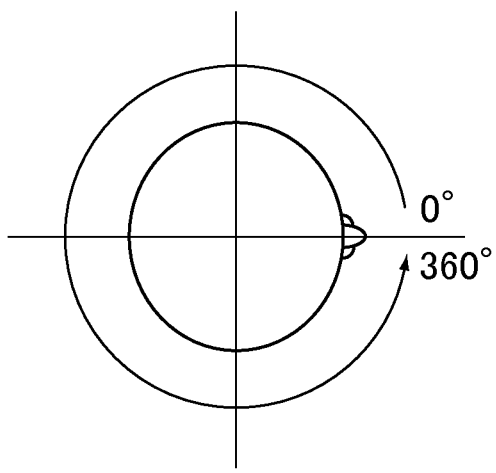
FIGS. 6A and 6B are views for explaining an example of application of angle training data to head regions of the present invention.

On the other hand, from the head region of the image for learning, the angle determination model 146 with reference to the angle of the head region is formed. Specifically, for example, as shown in FIG. 6A, in the case where the angle is specified to be increased counterclockwise with the front direction (direction of nose) being 0°, the training data, "angle: 10°", is applied to the head region of the image for learning of a person facing slightly left side. The angle determination model 146 is formed using many head regions to each of which the training data of angle is applied. Further, for example, the training data such as "gender: male" is applied to the head region to which the training data of angle is applied. Accordingly, for example, the training data such as "angle: 10°, gender: male" is applied to the head region. The angle-based attribute determination model 147 is formed using many head images to each of which the training data such as a gender is applied. Application of the training data such as the angle and the gender is made by a person by inputting using conventionally known input means such as a keyboard, a mouse, or the like, for example. It is preferable to form the angle determination model and the angle-based attribute determination model with respect to the head regions of the images for learning having different angles. The angle can be specified with the angle in the direction of nodding the neck or the angle in the direction of shaking the neck.

Next, as shown in the flowchart of FIG. 5A, the following steps are performed. First, an image to be determined is acquired by the image acquiring means 111 (step S11).

Next, in the same manner as in Embodiment 1, by the head region detecting means 121, the head region data is detected from the image to be determined by referring to the head detection model 141 formed preliminarily (step S21).

Next, in the same manner as in the attribute determining step S22 in Embodiment 1, an attribute is determined based on the image of the head by the non-angle-based attribute determining means 122-2 of determining the attribute based on the head image without reference to the angle of the head by referring to the non-angle-based attribute determination model 142-2 acquired preliminarily (step S22-2). In the case where the determination item is a gender, for example, in the same manner as in Embodiment 1, the determination can be made based on a gender degree (for example, 0 to 1).

A head image at a specific angle defined preliminarily is extracted by the angle determining means 126 by referring to the angle determination model 146 acquired preliminarily in parallel with or one after another with the attribute determination based on the image of the head without reference to the angle of the head (step S26). For example, in the case where the determination is made only with images in each of which the head is facing nearly the front, a specific angle region is defined as 0°±10°, for example. Subsequently, an attribute of the extracted head image at a specific angle defined preliminarily is determined by the angle-based attribute determining means 127 by referring to the angle-based attribute determination model 147 acquired preliminarily (step S27). In the case where the determination item is a gender, for example, in the same manner as described above, the determination can be made based on a gender degree (for example, 0 to 1).

Next, the determination result obtained in the non-angle-based attribute determining step S22-2 and the determination result obtained in the angle-based attribute determining step S27 are combined by the combining means 128 (step S28). In the combining step S28, the combination of the determination items (determination results) can be performed by the formula (1). In the case where the determination item is a gender, the combination of the determination results can be performed, for example, by the following formula (4).

$$\text{Gender degree of object to be determined} = \frac{\begin{pmatrix}\text{Confidence} \\ \text{level in gender} \\ \text{in whole}\end{pmatrix} \times \begin{pmatrix}\text{Gender} \\ \text{degree} \\ \text{in whole}\end{pmatrix} + \begin{pmatrix}\text{Confidence level} \\ \text{in angle-based} \\ \text{gender}\end{pmatrix} \times \begin{pmatrix}\text{angle-based} \\ \text{gender} \\ \text{degree}\end{pmatrix}}{\begin{pmatrix}\text{Confidence} \\ \text{level in gender} \\ \text{in whole}\end{pmatrix} + \begin{pmatrix}\text{Confidence level} \\ \text{in angle-based} \\ \text{gender}\end{pmatrix}} \quad (4)$$

In the formula (4), the "gender degree in whole" refers to the gender degree calculated in the non-angle-based attribute determining step S22-2. The "confidence level in gender in whole" can be expressed, for example, by a value greater than 0 and not more than 1 and indicates the level of the reliability of the gender degree calculated in the non-angle-based attribute determining step S22-2. The "angle-based gender degree" refers to the gender degree calculated in the angle-based attribute determining step S27. The "confidence level in angle-based gender" can be expressed, for example, by a value greater than 0 and not more than 1 and indicates the level of the reliability of the gender degree calculated in the angle-based attribute determining step S27. The confidence level in gender in whole and the confidence level in angle-based gender can be determined according to the performance of the model to be used. For example, in the case where the reliability is 70% accuracy when the gender is determined based on the whole image and the reliability is 80% accuracy when the gender is determined based on the image at a specific angle, by increasing the confidence level of the latter, the determination at high detection accuracy can be made.

Next, the combined determination result of the attribute is outputted by the output means 131 (step S31). The gender is determined from the value of the gender degree calculated by the combination, based on the criteria described in Embodiment 1, for example.

In the attribute determining method of Embodiment 3, the attribute is determined based on the image of the head without reference to the angle of the head, the attribute at a specific angle is determined, and then the attribute is determined by combining these determination results. Therefore, for example, the attribute can be determined with higher accuracy.

The formula (4) is a formula for the case where one image to be determined (frame) is used. The combination of the determination results can be performed by the formula (5) in the case where more than one frame is used. By increasing the number of frames, for example, the attribute can be determined based on the image with higher accuracy. In the formula (5), "n" represents the number of frames.

$$\text{Gender degree of object to be determined} = \frac{\sum_{i=1}^{n}\left\{\begin{pmatrix}\text{Confidence} \\ \text{level in gender} \\ \text{in whole}\end{pmatrix} \times \begin{pmatrix}\text{Gender} \\ \text{degree} \\ \text{in whole}\end{pmatrix}\right\} + \sum_{i=1}^{n}\left\{\begin{pmatrix}\text{Confidence level} \\ \text{in angle-based} \\ \text{gender}\end{pmatrix} \times \begin{pmatrix}\text{angle-based} \\ \text{gender} \\ \text{degree}\end{pmatrix}\right\}}{\sum_{i=1}^{n}\begin{pmatrix}\text{Confidence} \\ \text{level in gender} \\ \text{in whole}\end{pmatrix} + \sum_{i=1}^{n}\begin{pmatrix}\text{Confidence level} \\ \text{in angle-based} \\ \text{gender}\end{pmatrix}} \quad (5)$$

Further, in the angle-based attribute determining step (S27 in FIG. 5A) in the attribute determining method of Embodiment 3, the attribute is determined based on the image at the angle by referring to the angle-based attribute determination model. However, the present invention is not limited thereto. The attribute at the angle may be determined by referring to an angle-based attribute determination rule, for example. An example of the angle-based attribute determination rule includes the rule such as "it is determined as a male if an Adam's apple is seen in the head region from the side and it is determined as a female if an Adam's apple is not seen in the head region from the side". Further, for example, the attribute at the angle may be determined by referring to both the angle-based attribute determination model and the angle-based attribute determination rule. In this case, for example, the angle-based attribute determination rule may be stored in the data storage means and the angle-based attribute determining means may be connected to the angle-based attribute determination rule.

In the attribute determining method of Embodiment 3, as described above, the angle of the head region is expressed by a numerical value (0° to 360°), the angle determination model is formed by applying the angle training data, and the angle of the head region is determined in the angle determining step. In the angle display method of this type, for example, there is a case of causing a false recognition that there is a great difference (angle difference: 358°) between the case where a person faces 1° (angle: 1°) left from the front direction (angle: 0°) and the case where a person faces 1° (angle: 359°) right from the front direction (angle: 0°) despite the fact that the angle difference therebetween with respect to the front direction (angle: 0°) is 2° (for example, within a tolerance).

Figure 6B:
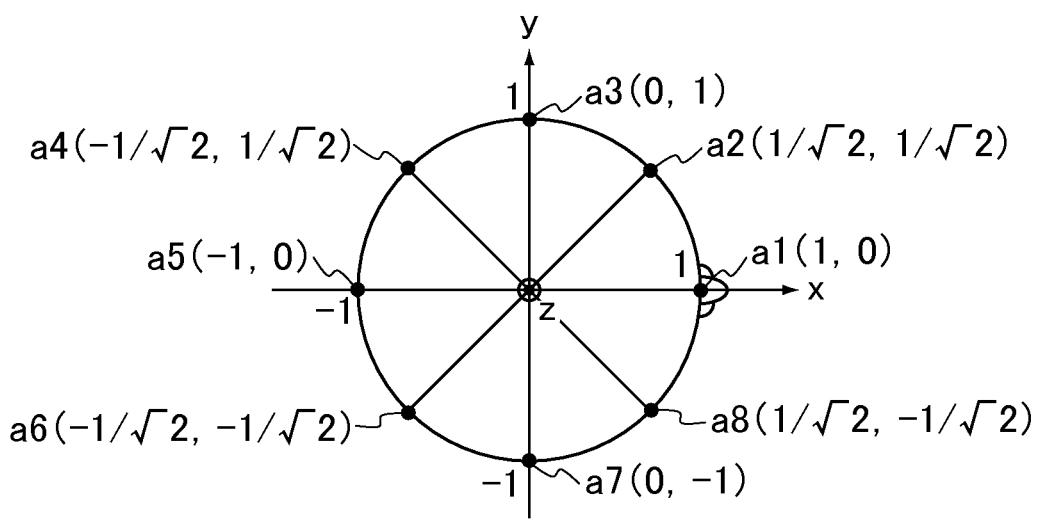

For avoiding such a false recognition, in the attribute determining method of the present invention, the angle of the head region is preferably shown by a coordinate (x, y). Specifically, for example, as shown in FIG. 6B, the angle of the head region is shown by a coordinate on a circumference of a circle having a radius of 1 centering on the intersection of an x-axis and a y-axis on an x-y plane having the x-axis and the y-axis vertically intersecting each other and vertical to a z-axis, which is a body-axial direction. In the case where the angle of the front direction (direction of nose) of a person is specified as 0° and shown by the coordinate a1 (1, 0), for example, the angle 10° can be shown by the coordinate (cos 10°, sin 10°). The directions according to the 8 directions can be represented by 45°: a2 (1/√2, 1/√2), 90°: a3 (0, 1), 135°: a4 (−1/√2, 1/√2), 180°: a5 (−1, 0), 225°: a6 (−1/√2, −1/√2), 270°: a7 (0, −1), and 315°: a8 (1/√2, −1/√2). By showing the angle by the coordinate, for example, any angle such as an angle between the aforementioned angles can be recognized. By showing the angle of the head region by the coordinate in this manner, applying the angle training data to the head region of the image for learning, and using many head regions to each of which the angle training data is applied, the angle determination model is formed. By referring to the angle determination model, the angle of the head region is determined in the angle determining step.

In the attribute determining method of the present invention, for example, both the partial attribute determining step and the angle-based attribute determining step can be performed in combination. In such a case, for example, the attribute can be determined by combining the determination result obtained in the partial attribute determining step and the determination result obtained in the angle-based attribute determining step. Further, in the attribute determining method of Embodiment 3, the gender as an attribute is determined. For example, the angle itself as an attribute can be determined.

Embodiment 4

The program of Embodiment 4 is a program that allows a computer to execute the attribute determining method. The program of Embodiment 4 may be recorded, for example, in a recording medium. There is no particular limitation on the recording medium, and examples of the recording medium include a random access memory (RAM), a read-only memory (ROM), a hard disk (HD), an optical disk, and a floppy (registered trade mark) disk (FD).

Embodiment 5

Figure 7:
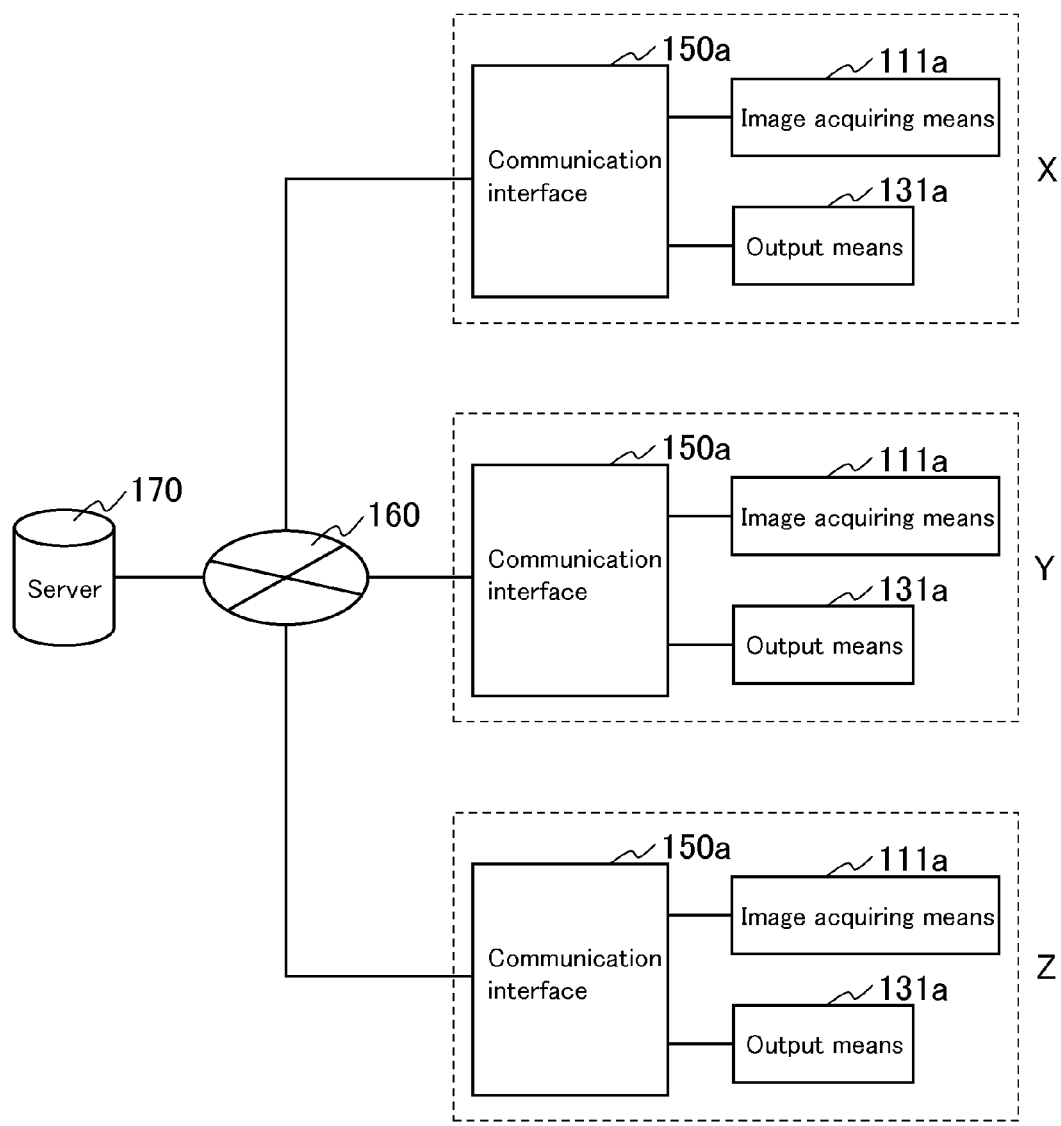
FIG. 7 is a block diagram showing the configuration of an example (Embodiment 5) of the attribute determining system using the attribute determining apparatus of the present invention.

FIG. 7 shows the configuration of an example of the attribute determining system using the attribute determining apparatus of the present invention. As shown in FIG. 7, the attribute determining system is provided with image acquiring means (units) 111a, 111b, and 111c; output means (units) 131a, 131b, and 131c; communication interfaces 150a, 150b, and 150c; and a server 170. The image acquiring means 111a and the output means 131a are connected to the communication interface 150a. The image acquiring means 111a, the output means 131a, and the communication interface 150a are arranged at the site "X". The image acquiring means 111b and the output means 131b are connected to the communication interface 150b. The image acquiring means 111b, the output means 131b, and the communication interface 150b are arranged at the site "Y". The image acquiring means 111c and the output means 131c are connected to the communication interface 150c. The image acquiring means 111c, the output means 131c, and the communication interface 150c are arranged at the site "Z". The communication interfaces 150a, 150b, and 150c are connected to the server 170 via a network 160.

This attribute determining system includes head region detecting means and attribute determining means at the server 170 side, and a head detection model and an attribute determination model are stored in the server 170. For example, an image to be determined acquired at the site "X" using the image acquiring means 111a is sent to the server 170, the head region is detected at the server 170 side, and the determination of the attribute is performed based on the image of the head. Then, among the detected head region and the determined attribute, at least the attribute is outputted by the output means 131a. For example, the head determination rule and the attribute determination rule also may be stored in the server.

According to the attribute determining system of Embodiment 5, by arranging the image acquiring means and the output means on-site and arranging the server and the like at other sites, the head region detection and attribute determination can be performed online. Therefore, for example, the system does not require a space for arranging devices and maintenance is not complicated. Furthermore, for example, even in a case where the sites at which the devices are set are distanced from one another, the system can be controlled centrally or remotely. The attribute determining system of Embodiment 5 may be the system corresponding to the partial attribute determination of Embodiment 2 and the angle-based attribute determination of Embodiment 3. Furthermore, the attribute determining system of Embodiment 5 may be, for example, the system corresponding to cloud computing.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2010-149935 filed on Jun. 30, 2010, the disclosure of which is incorporated herein in its entirety by reference.

INDUSTRIAL APPLICABILITY

According to the present invention, an attribute determining method, an attribute determining apparatus, a program, a recording medium, and an attribute determining system of high detection accuracy with which an attribute of a person can be determined even in the case where a person is not facing nearly the front can be provided. Therefore, for example, an attribute of a person can be determined using an existing surveillance camera or the like, and the present invention can be applied to a wide range of fields.

EXPLANATION OF REFERENCE NUMERALS 10a, 10b, 10c, and 10d image for learning
11a, 11b, 11c, and 11d label
20 image to be determined
111, 111a, 111b, and 111c image acquiring means
120 computing means
121 head region detecting means
122 attribute determining means
122-1 whole attribute determining means
122-2 non-angle-based attribute determining means
123 partial detecting means
124 partial attribute determining means
125 and 128 combining means
126 angle determining means
127 angle-based attribute determining means
131, 131a, 131b, and 131c output means
140 data storage means
141 head detection model
142 attribute determination model
142-1 whole attribute determination model
142-2 non-angle-based attribute determination model
144 partial attribute determination model
146 angle determination model
147 angle-based attribute determination model
150a, 150b, and 150c communication interface
160 network
170 server
241 head determination rule
242 attribute determination rule

The invention claimed is:

1. An attribute determining method comprising:
an image acquiring step of acquiring an image to be determined;
a head region detecting step of detecting a head region from the image to be determined; and
an attribute determining step of determining an attribute based on an image of the head, wherein the attribute determining step comprises:
  a whole attribute determining step of determining the attribute based on the whole head region;
  a partial detecting step of detecting a part of the head region;
  a partial attribute determining step of determining the attribute based on the part of the head region; and
  a combining step of combining determination results obtained in the whole attribute determining step and the partial attribute determining step, wherein in the combining step, combination of determination items is performed using a level of reliability of the determination items.

2. The method according to claim 1, further comprising:
an alignment step of aligning the head region detected in the head region detecting step.

3. The method according to claim 1, wherein
in the head region detecting step, the head region is detected from the image to be determined by referring to at least one of a head detection model acquired preliminarily and a head determination rule; and
in the attribute determining step, the attribute is determined based on the image of the head by referring to at least one of an attribute determination model acquired preliminarily and an attribute determination rule.

4. The method according to claim 1, wherein
in the partial attribute determining step, the attribute of the part of the head region is determined by referring to at least one of a partial attribute determination model acquired preliminarily and a partial attribute determination rule.

5. The method according to claim 1, wherein the attribute determining step further comprises:
a non-angle-based attribute determining step of determining the attribute based on the head image without reference to an angle of the head;
an angle determining step of determining an angle of the head region detected in the head region detecting step;
an angle-based attribute determining step of determining the attribute based on an image at a specific angle defined preliminarily; and
a combining step of combining determination results obtained in the non-angle-based attribute determining step and the angle-based attribute determining step.

6. The method according to claim 5, wherein
in the angle-based attribute determining step, the angle-based attribute is determined by referring to at least one of an angle-based attribute determination model acquired preliminarily and an angle-based attribute determination rule.

7. The method according to claim 5, wherein, in the angle determining step, the angle of the head region is shown by a coordinate on a circumference of a circle having a radius of 1 centering on an intersection of an x-axis and a y-axis on an x-y plane having the x-axis and the y-axis vertically intersecting each other and vertical to a z-axis, which is a body-axial direction.

8. The method according to claim 1, wherein in the combining step, the combination of determination items is performed by the following formula (1)

$$\text{Attribute degree of object to be determined} = \frac{\sum_{i=1}^{n} \{(\text{Confidence level in determination item}) \times (\text{Attribute degree})\}}{\sum_{i=1}^{n} (\text{Confidence level in determination item})}. \quad (1)$$

9. An attribute determining apparatus comprising:
at least one processor which implements:
an image acquiring unit which acquires an image to be determined;
a head region detecting unit which detects a head region from the image to be determined; and
an attribute determining unit which determines an attribute based on an image of the head, wherein the attribute determining unit comprises:
  a whole attribute determining unit which determines the attribute based on the whole head region;
  a partial detecting unit which detects a part of the head region;
  a partial attribute determining unit which determines the attribute based on the part of the head region; and
  a combining unit which combines determination results obtained by the whole attribute determining unit and the partial attribute determining unit, wherein the combining unit performs combination of determination items using a level of reliability of the determination items.

10. The apparatus according to claim 9, wherein the at least one processor further implements:
an alignment unit which aligns the head region detected by the head region detecting unit.

11. The apparatus according to claim 9, further comprising:
at least one of a head detection model acquired preliminarily and a head determination rule and at least one of an attribute determination model acquired preliminarily and an attribute determination rule, wherein
the head region detecting unit detects the head region from the image to be determined by referring to at least one of the head detection model and the head determination rule, and
the attribute determining unit determines the attribute based on the image of the head by referring to at least one of the attribute determination model and the attribute determination rule.

12. The apparatus according to claim 9, further comprising:
at least one of a partial attribute determination model acquired preliminarily and a partial attribute determination rule, wherein
the partial attribute determining unit determines the attribute of the part of the head region by referring to at least one of the partial attribute determination model and the partial attribute determination rule.

13. The apparatus according to claim 9, wherein the attribute determining unit comprises:
a non-angle-based attribute determining unit which determines the attribute based on the head image without reference to an angle of the head;
an angle determining unit which determines an angle of the head region detected by the head region detecting unit;
an angle-based attribute determining unit which determines the attribute based on the image at a specific angle defined preliminarily; and
a combining unit which combines determination results obtained by the non-angle-based attribute determining unit and the angle-based attribute determining unit.

14. The apparatus according to claim 13, further comprising:
at least one of an angle-based attribute determination model acquired preliminarily and an angle-based attribute determination rule, wherein
the angle-based attribute determining unit determines the angle-based attribute by referring to at least one of the angle-based attribute determination model and the angle-based attribute determination rule.

15. The apparatus according to claim 13, wherein the angle determining unit shows the angle of the head region by a coordinate on a circumference of a circle having a radius of 1 centering on an intersection of an x-axis and a y-axis on an x-y plane having the x-axis and the y-axis vertically intersecting each other and vertical to a z-axis, which is a body-axial direction.

16. The apparatus according to claim 9, wherein the combining unit performs the combination of determination items by the following formula (1)

$$\text{Attribute degree of object to be determined} = \frac{\sum_{i=1}^{n} \{(\text{Confidence level in determination item}) \times (\text{Attribute degree})\}}{\sum_{i=1}^{n} (\text{Confidence level in determination item})}. \quad (1)$$

17. A non-transitory computer-readable medium having recorded thereon a program for causing a computer to execute the attribute determining method according to claim 1.

18. An attribute determining system comprising:
at least one processor which implements:
an image acquiring unit which acquires an image to be determined;
a head region detecting unit which detects a head region from the image to be determined;
an attribute determining unit which determines an attribute based on an image of the head, wherein the attribute determining unit comprises:
a whole attribute determining unit which determines the attribute based on the whole head region;
a partial detecting unit which detects a part of the head region;
a partial attribute determining unit which determines the attribute based on the part of the head region; and
a combining unit which combines determination results obtained by the whole attribute determining unit and the partial attribute determining unit, wherein the combining unit performs combination of determination items using a level of reliability of the determination items;
at least one of a head detection model acquired preliminarily and a head determination rule;
at least one of an attribute determination model and an attribute determination rule for the determining the attribute based on the image of the head; and
an output unit which outputs a result of an attribute determination, wherein the image acquiring unit and the output unit are connected to the head region detecting unit, the attribute determining unit, at least one of the head detection model and the head determination rule, and at least one of the attribute determination model and the attribute determination rule via a communication network provided outside of the system.

* * * * *